United States Patent
Min

(10) Patent No.: US 6,577,288 B1
(45) Date of Patent: Jun. 10, 2003

(54) FLAT PANEL DISPLAY DEVICE FOR PROTECTING A LIQUID CRYSTAL DISPLAY THEREOF

(75) Inventor: Yoon-Ki Min, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/270,848

(22) Filed: Mar. 18, 1999

(30) Foreign Application Priority Data

Mar. 20, 1998 (KR) .............................. 98-9621

(51) Int. Cl.⁷ .............................. H04K 5/02; G09G 3/36
(52) U.S. Cl. .......................... 345/87; 361/681
(58) Field of Search .............................. 361/681; 345/87

(56) References Cited

U.S. PATENT DOCUMENTS 5,477,357 A * 12/1995 Suzuki et al. ............... 349/110
5,835,343 A * 11/1998 Johns et al. ................. 361/681
6,212,067 B1 * 4/2001 Nakajima et al. ........... 361/681

* cited by examiner

*Primary Examiner*—Steven Saras
*Assistant Examiner*—William Spencer
(74) *Attorney, Agent, or Firm*—Staas & Halsey LLP

(57) ABSTRACT

A flat panel display device having a structure for preventing a liquid crystal display from being damaged by outside impact incurred against a front case, and for preventing a foreign substance from entering the flat panel display device between the front case and glass at a front side of the liquid crystal display, and having an improved appearance as a gap between the front case and the glass of the liquid crystal display is minimized. The flat panel display device includes a liquid crystal display displaying images according to display signals; a chassis member having a frame which is folded with a front frame of a glass of the liquid crystal display, to support a surface of the glass of the liquid crystal display; a front case having a vessel surface which supports the frame of the chassis member as well as an inside of the frame which is positioned near to the glass of the liquid crystal display; and a rear case which fixes the liquid crystal display using a bracket member supporting a rear side of the liquid crystal display.

12 Claims, 4 Drawing Sheets

FLAT PANEL DISPLAY DEVICE FOR PROTECTING A LIQUID CRYSTAL DISPLAY THEREOF

CROSS-REFERENCE TO RELATED APPLICATION

This application makes reference to, incorporates the same herein, and claims all benefits accruing under 35 U.S.C. §119 from my application entitled *A FLAT PANEL DISPLAY DEVICE PROTECTING A LIQUID CRYSTAL DISPLAY THEREOF* filed with the Korean Industrial Property Office on Mar. 20, 1998 and there duly assigned Ser. No. 98-09621 by that Office.

BACKGROUND OF THE INVENTION

1. Field of the Invention

The present invention relates to a flat panel display device having a liquid crystal display, and more particularly, to a flat panel display device having a structure for preventing a liquid crystal display from being damaged by outside impacts against a front case to which the liquid crystal display is mounted.

2. Description of the Related Art

As shown in FIGS. 1–2, a conventional flat panel display device is generally provided with a flat panel display 2 having a liquid crystal display with glass 7, the liquid crystal display 1 being fixed in place by a front case 3 and a rear case 4. Further, a stand 5 for supporting the flat panel display 2 is located at a lower part of the flat panel display 2.

In addition, as shown in FIG. 2, the flat panel display 2 is provided with a relatively thin, that is, about 0.7 mm thick, glass 7 for the liquid crystal display 1, a frame and a rear side of which are surrounded by a chassis member 6. The front case 3 is so installed so that an end portion of a vessel surface 3a comes into close contact with an end portion of the glass 7.

In this case, when the vessel surface 3a of the front case 3 is pushed down by an external force, the glass 7 for the liquid crystal 1 receives a force given to the vessel surface 3a through the front case 3 and is pushed down thereby.

As a result, a liquid crystal material within the relatively thin glass 7 for the liquid crystal display 1 is spread and shows up in spotted pictures and so a falling-off in display quality occurs.

To avoid this problem, as shown in FIG. 2, an inside edge of the chassis member 6 is installed so as to be folded with a certain width of an outside edge of the glass 7 and is installed so that the front case 3 comes into contact with an outside of the inside edge of the chassis member 6. As a gap between the front case 3 and the glass 7 becomes large, an absorption of an impact transmitted from the front case 3 to the glass 7 is attempted.

However, in this case, as the gap between the front case 3 and the glass 7 becomes large, the flat panel display device does not look pleasant externally and a deterioration in quality of the flat panel display device 2 may occur because a foreign substance can infiltrate between the front case 3 and the glass 7.

SUMMARY OF THE INVENTION

Accordingly, in order to overcome such drawbacks in the conventional art, it is therefore an object of the present invention to provide a flat panel display device having a structure for preventing a liquid crystal display having a glass from being damaged by an outside impact against a front case of the flat panel display device.

It is another object of the present invention to provide a flat panel display device for preventing a foreign substance from entering between the front case and the glass, and having a better appearance as a gap between the front case and the glass of the liquid crystal display is minimized.

Additional objects and advantages of the invention will be set forth in part in the description which follows and, in part, will be obvious from the description, or may be learned by practice of the invention.

To achieve the above and other objects and advantages and in accordance with the purpose of the present invention, as embodied and broadly described, there is provided a flat panel display device including a liquid crystal display having a glass and displaying images according to display signals; a chassis member having a frame which is folded with a front frame of the glass of the liquid crystal display to support a surface of the glass of the liquid crystal display; a front case having a vessel surface which contacts the frame of the chassis member, where the vessel member has a frame with an inside region which is positioned near to the glass of the liquid crystal display; and a rear case fixing the liquid crystal display in place using a bracket member which supports a rear side of the liquid crystal display.

Herein, a rib for contacting the chassis member is formed in an inside region of the vessel surface of the front case, and a rib for protecting the glass is positioned near to the surface of the glass and formed in the frame of the vessel surface.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DESCRIPTION OF THE PREFERRED EMBODIMENT

The present invention will be apparent from the following detailed description in conjunction with the accompanying drawings.

Figure 1:
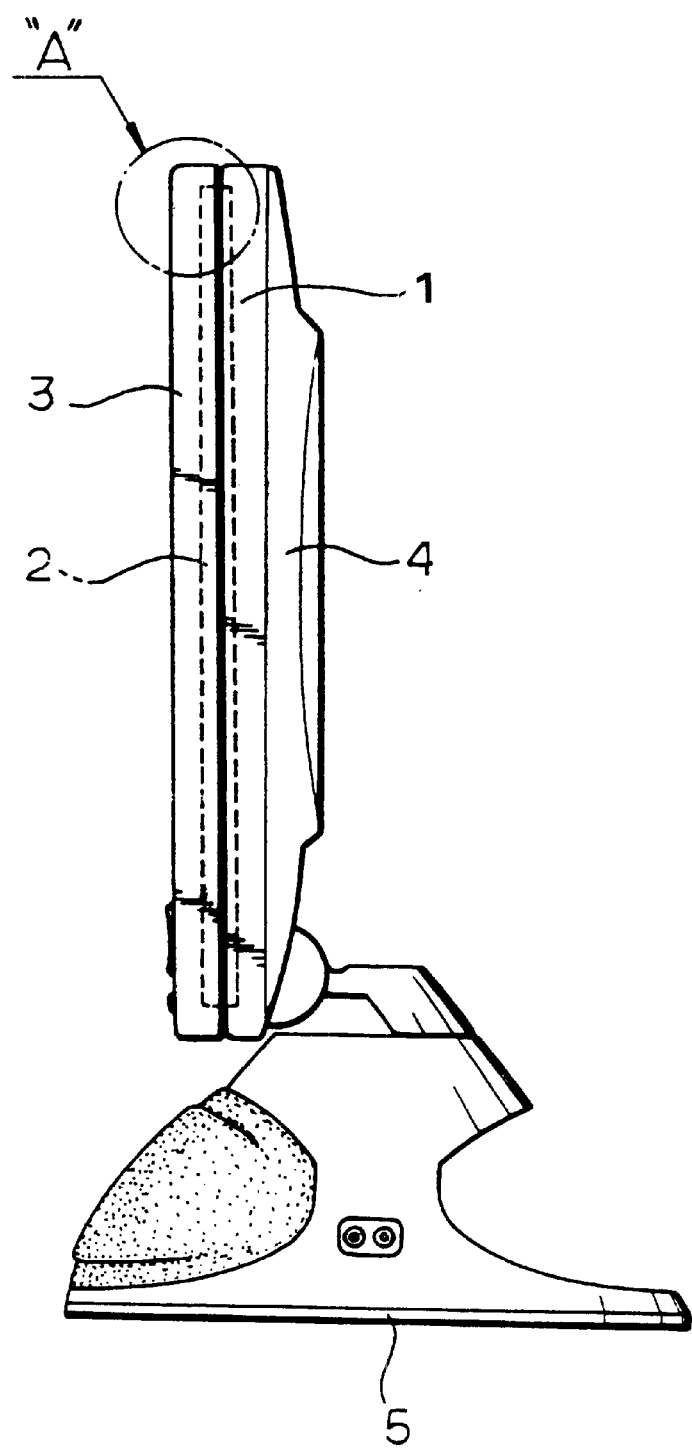
FIG. 1 is a side view illustrating a structure of a conventional flat panel display device.
Figure 2:
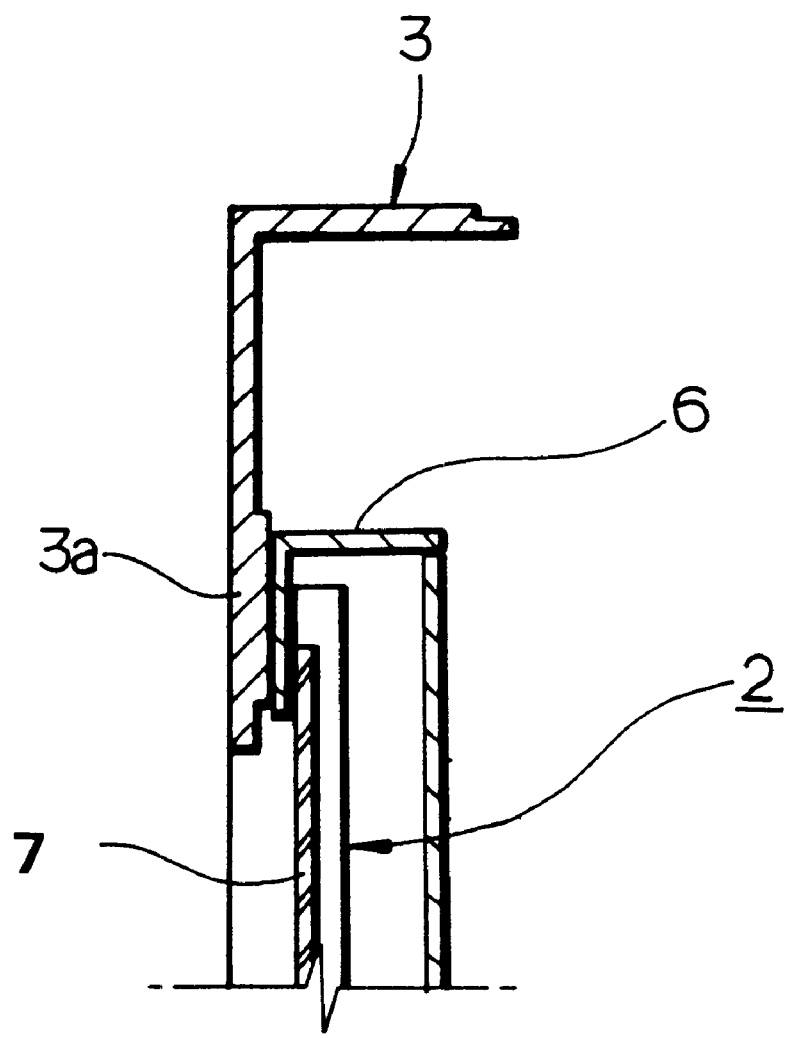
FIG. 2 is a partly enlarged sectional view of area "A" of FIG. 1 illustrating a conventional technique.
Figure 3:
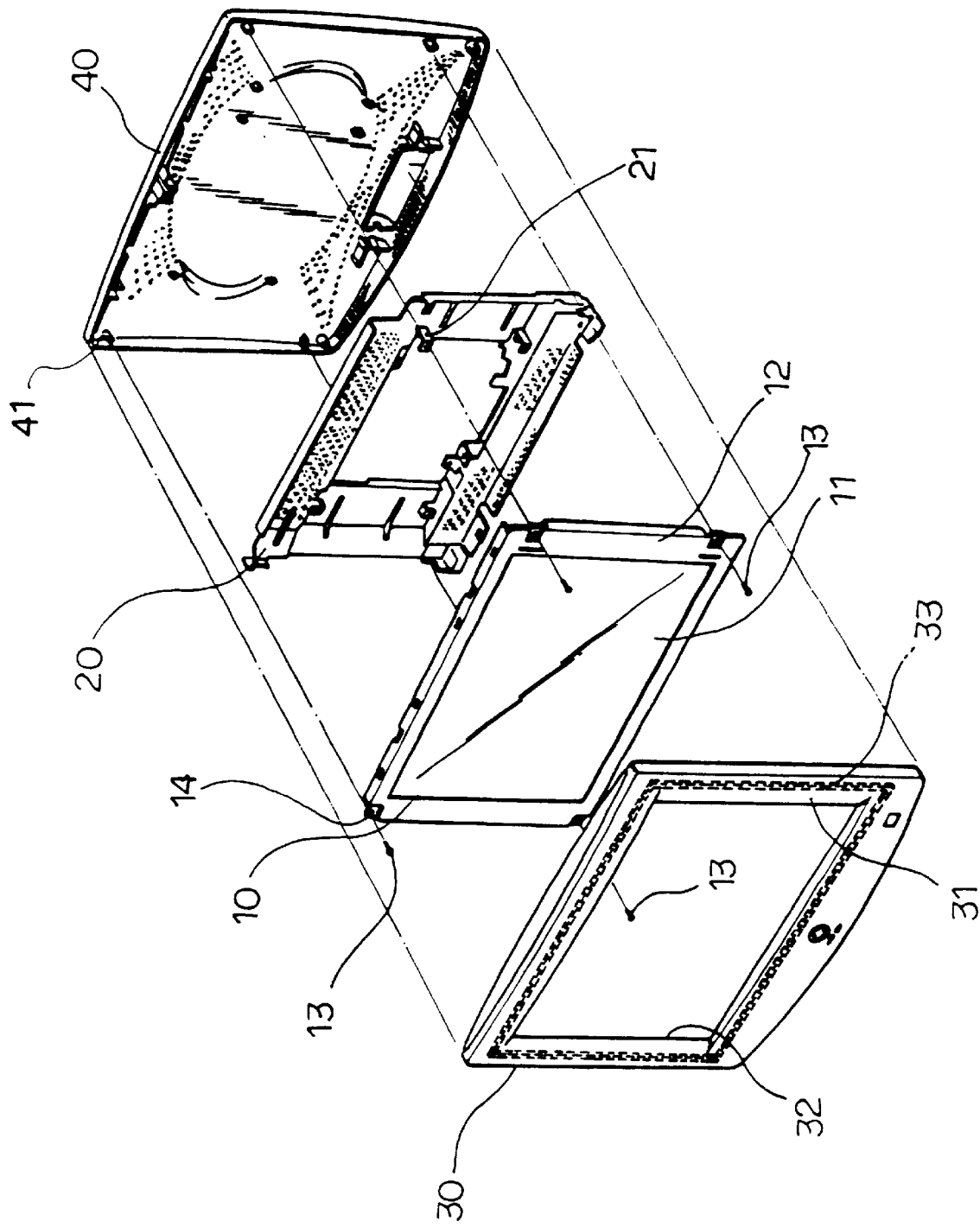
FIG. 3 is an exploded perspective view illustrating main parts of a flat panel display device according to an embodiment of the present invention.

Referring to FIG. 3, a flat panel display device includes a liquid crystal display 10 displaying images according to display (image) signals, a bracket member 20 supporting the liquid crystal display 10 at the rear thereof, a rear case 40 for fixing the liquid crystal display 10 using the bracket member 20, and a front case 30 being located in front of the liquid crystal display 10 and being secured to the rear case 40, thereby forming a casing to hold the liquid crystal display 10 and the bracket member 20.

The liquid crystal display 10 is provided with a liquid crystal material having conventionally an established arrangement between two pieces of liquid crystal glasses (only a liquid crystal glass 11 of the front side is illustrated), which displays images according to the display signals. Therefore, images being displayed on the liquid crystal display 10 are formed in a quadrangle and the front and rear cases 30, 40 for fixing the liquid crystal display 10 are constituted in a quadrangle as well.

As shown in FIG. 3, a frame of the glass 11 in the liquid crystal display 10 is fixed to a chassis member 12 being made of a metal material, which includes a plurality of thru holes 14. A plurality of screws 13 are combined with a plurality of bosses 41 provided in the rear case 40 using thru holes 21 formed in the bracket member 20 and thru holes 14 formed in the chassis member 12. Accordingly, the liquid crystal display 10 is fixed and installed to the rear case 40 using the bracket member 20.

When the front case 30 is installed to the rear case 40 after the liquid crystal display 10 has been installed in the rear case 40 using the bracket member 20, the assembly of a flat panel display device is completed.

Figure 5:
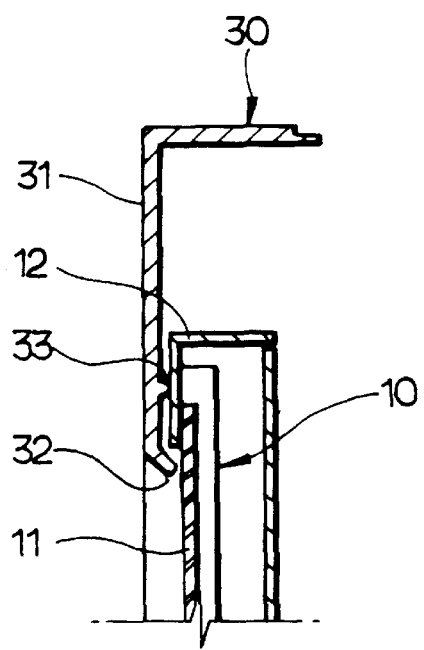
FIG. 5 is a cross-sectional view illustrating main parts of the flat panel display device according to the embodiment of the present invention.

A vessel surface 31 is so formed as to be loosely inclined toward the liquid crystal display 10 in a front of the front case 30. A rib 32, which protects the glass 11, is integrated into the front case 30 in the inside frame of the vessel surface 31 and, as shown in FIG. 5, slopes toward and is located to extend near the surface of the glass 11 of the liquid crystal display 10. As a result of the rib 32 protecting the glass 11 by sloping toward the glass 11, foreign substances are prevented from getting between the front case 30 and the glass 11.

In addition, when the front case 30 is jointed to the rear case 40, a rib 33, which contacts the chassis member 12 to prevent the glass 11 from receiving impact frame external forces applied to the vessel surface 31, is integrally formed in the inside of the vessel surface 31.

Figure 4:
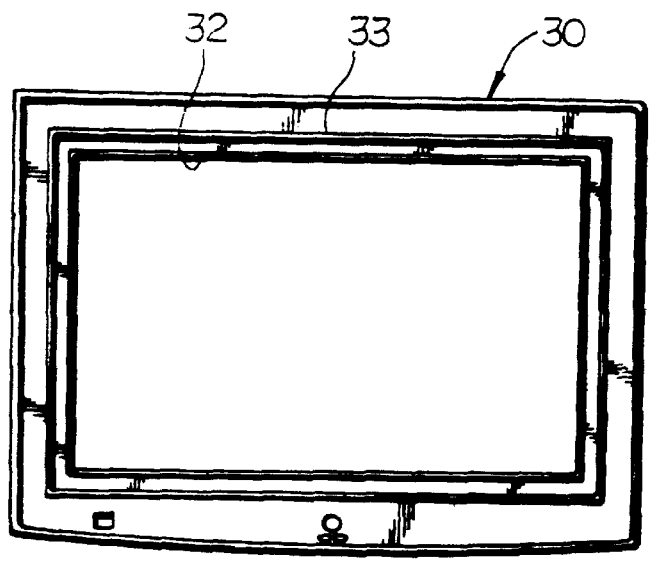
FIG. 4 is a rear elevation of a front case of the flat panel display device according to the embodiment of the present invention.

The rib 32 which protects glass 11 and the rib 33 which contacts the chassis member 12, as shown in FIG. 4, are formed along the inside frame of the vessel surface 31, while the rib 33 is formed in a place to be evenly in contact with the frame of the chassis member 12 when the front case 30 is jointed to the rear case 40.

Accordingly, referring to FIG. 5 illustrating the installed state of the liquid crystal display 10 and the front case 30, the rib 33 in the inside of the vessel surface 31 is assembled in a state in contact with the chassis member 12 of the liquid crystal display 10 such that the rib 32 is only approximated to the glass 11, not in contact directly thereto.

Consequently, when the front case 30 receives a force from the outside, the force is conveyed only to the rib 33 and consequently the chassis member 12 receives the impact, but the glass 11 is not pushed down by the rib 32 and thus the glass 11 can be surely protected from the impact.

Accordingly, the present invention can prevent the glass from being pushed down by the impact given to the front case from the outside because the force from the outside is conveyed only to the chassis member thanks to the rib provided on the inside of the vessel surface of the front case. Further, the present invention can protect against foreign substances entering between the front case and the glass. In addition, as the gap between the front case and the glass for a liquid crystal is minimized, the flat panel display device can have an improved appearance.

It will be apparent to those skilled in the art that various modifications can be made in the present invention, without departing from the spirit of the invention. Thus, it is intended that the present invention cover such modifications as well as variations thereof, within the scope of the appended claims and their equivalents.

What is claimed is:

1. A flat panel display device, comprising:
   a liquid crystal display to display images according to display signals, having glass with a front frame at an edge thereof;
   a chassis member having a frame which is folded along ends of the front frame of the glass, to support a surface of the glass;
   a front case having a vessel surface which contacts the folded portions of the frame of said chassis member, wherein the vessel surface has an extended frame with an inside region which extends inward towards a periphery of the glass for the liquid crystal display; and
   a bracket member to support a rear side of the liquid crystal display;
   a rear case attached to the front case, to fix the liquid crystal display in place using the bracket member;
   a first rib contacting the chassis member, which is formed in an inside region of the vessel surface of the front case; and
   a second rib protecting the glass, which is positioned adjacent to the surface of the glass and formed in the frame of the vessel surface.

2. The flat panel display device as claimed in claim 1, wherein the second rib protecting the glass slopes at an oblique angle from an outer surface of the front case toward the glass.

3. The flat panel display device as claimed in claim 1, wherein the frame of the vessel surface does not contact the glass.

4. A flat panel display device to produce images in response to display signals, comprising:
   a liquid crystal display to display images according to the display signals, and having glass with a front periphery formed at an edge thereof;
   a chassis member having a frame to support a surface of the glass by contacting the front periphery; and
   a front case having a vessel surface which contacts the frame of the chassis member, wherein the vessel surface has a rib which sloped at an oblique angle toward the surface of the glass and extends adjacent to and surrounds the periphery of the glass without contacting the surface of the glass, wherein the vessel surface has a rib extending from an inside surface thereof, to contact the frame of the chassis member.

5. The flat panel display device as claimed in claim 4, wherein the rib of the vessel surface overlaps a portion of the frame of the chassis member which supports the surface of the glass in a direction parallel to the surface of the glass.

6. The flat panel display device as claimed in claim 5, wherein the frame of the chassis member folds over the liquid crystal display so as to be in contact with the front periphery thereof.

7. The flat panel display device as claimed in claim 6, wherein the vessel surface has a rib extending from an inside surface thereof, to contact the frame of the chassis member.

8. The flat panel display device as claimed in claim 5, wherein the vessel surface has a rib extending from an inside surface thereof, to contact the frame of the chassis member.

9. The flat panel display device as claimed in claim 4, wherein the frame of the chassis member folds over the liquid crystal display so as to be in contact with the front periphery thereof.

10. The flat panel display device as claimed in claim 9, wherein the vessel surface has a rib extending from an inside surface thereof, to contact the frame of the chassis member.

11. A flat panel display device to produce images in response to display signals, comprising:

a liquid crystal display to display images according to the display signals, and having glass with a front frame formed at an edge thereof;

a chassis member having a frame to support a surface of the glass by contacting the front surface of the glass; and a front case having a vessel surface which contacts the frame of the chassis member, wherein the vessel surface conveys an external force to the chassis member and not the glass, and prevents foreign substances from coming between the surface of the glass and the front case by minimizing a distance between the front case and the surface of the glass at a periphery of the surface of the glass, the vessel surface including a rib extending from an inside surface thereof, to contact the frame of the chassis member.

12. The flat panel display device as claimed in claim 11, wherein the vessel surface as a rib which slopes inward to the surface of the glass at and around the periphery of the surface of the glass.

\* \* \* \* \*